(12) United States Patent
Savagian et al.

(10) Patent No.: US 8,866,361 B2
(45) Date of Patent: Oct. 21, 2014

(54) BAR CONDUCTOR SHAPES FOR ELECTRIC MACHINES

(75) Inventors: Peter J. Savagian, Bloomfield Hills, MI (US); Rajeev Vyas, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 316 days.

(21) Appl. No.: 13/274,543

(22) Filed: Oct. 17, 2011

(65) Prior Publication Data

US 2013/0093281 A1 Apr. 18, 2013

(51) Int. Cl.
*H02K 3/04* (2006.01)
*H02K 3/12* (2006.01)

(52) U.S. Cl.
CPC .................................... *H02K 3/12* (2013.01)
USPC .......................................... 310/201; 310/208

(58) Field of Classification Search
CPC .............. H02K 3/12; H02K 3/28; H02K 3/18
USPC .................................................. 310/201, 208
See application file for complete search history.

(56) References Cited

U.S. PATENT DOCUMENTS

| | | | |
|---|---|---|---|
| 3,860,744 A * | 1/1975 | Schuler .................... | 174/117 FF |
| 5,587,619 A * | 12/1996 | Yumiyama et al. ........... | 310/201 |
| 5,744,896 A * | 4/1998 | Kessinger et al. ............ | 310/268 |
| 6,281,614 B1 * | 8/2001 | Hill ............................. | 310/207 |
| 6,856,063 B1 * | 2/2005 | Kelecy et al. ................ | 310/179 |
| 6,858,963 B2 * | 2/2005 | Neet ............................. | 310/201 |
| 6,894,418 B2 * | 5/2005 | Jones et al. .................... | 310/208 |
| 6,926,588 B2 * | 8/2005 | Janssen et al. .................. | 451/28 |
| RE38,939 E * | 1/2006 | Kessinger et al. ............. | 310/268 |
| 7,759,834 B2 * | 7/2010 | Onimaru et al. ............... | 310/201 |
| 7,830,062 B2 * | 11/2010 | Fujii et al. ...................... | 310/201 |
| 2002/0043886 A1 * | 4/2002 | Fujita et al. .................... | 310/201 |
| 2002/0153799 A1 * | 10/2002 | Kurahashi et al. ............ | 310/201 |
| 2003/0025419 A1 * | 2/2003 | Leonov ......................... | 310/208 |
| 2004/0046476 A1 * | 3/2004 | Becherucci et al. .......... | 310/207 |
| 2005/0116571 A1 * | 6/2005 | Ichikawa et al. .............. | 310/201 |
| 2005/0162025 A1 * | 7/2005 | Sivasubramaniam et al. .. | 310/64 |
| 2005/0275304 A1 * | 12/2005 | El-Gabry et al. ............. | 310/179 |
| 2006/0145558 A1 * | 7/2006 | Kashihara et al. ............ | 310/180 |
| 2007/0018525 A1 * | 1/2007 | Cai et al. ........................ | 310/184 |
| 2008/0007133 A1 * | 1/2008 | Onimaru et al. .............. | 310/208 |
| 2008/0136274 A1 * | 6/2008 | Fujii et al. ........................ | 310/71 |
| 2009/0174279 A1 * | 7/2009 | Sheaffer et al. ............... | 310/201 |
| 2009/0267441 A1 * | 10/2009 | Hiramatsu et al. ............ | 310/208 |
| 2010/0320864 A1 * | 12/2010 | Rahman et al. ............... | 310/201 |
| 2011/0109186 A1 * | 5/2011 | Baumann ...................... | 310/201 |
| 2011/0162423 A1 * | 7/2011 | Kamibayashi et al. ........ | 72/11.1 |
| 2011/0163626 A1 * | 7/2011 | Kamibayashi et al. ....... | 310/201 |
| 2011/0193443 A1 * | 8/2011 | Savagian et al. .............. | 310/201 |

* cited by examiner

*Primary Examiner* — Tran Nguyen
*Assistant Examiner* — Alex W Mok
(74) *Attorney, Agent, or Firm* — Quinn Law Group, PLLC

(57) ABSTRACT

A conductor is provided for an electric machine having an axis, a radial direction extending outward from the axis, and a tangential direction perpendicular to the radial direction. The conductor includes a solid core, having radial faces substantially perpendicular to the radial direction of the electric machine and tangential faces substantially perpendicular to the tangential direction of the electric machine. At least one tangential depression is formed on at least one of the tangential faces. The tangential depression creates a tangential void within a rectangular envelope defined by the solid core. Therefore, the surface area of the solid core is greater than the surface area of the rectangular envelope.

11 Claims, 7 Drawing Sheets

BAR CONDUCTOR SHAPES FOR ELECTRIC MACHINES

TECHNICAL FIELD

This disclosure relates to bar conductors for stators or rotors of electric machines.

BACKGROUND

A stator is the stationary component of an electric machine. The stator interacts with a rotor, which is the moving component of the electric machine. The stator and rotor allow the electric machine to convert mechanical energy to electrical energy (generator) and to convert electrical energy to mechanical energy (motor). Electric machines are capable of being operated in either generating or motoring modes, depending upon the control state. Some stators and rotors have permanent magnets and some have conductors or windings that provide electromagnetic fields.

SUMMARY

A conductor for an electric machine is provided. The electric machine has an axis, a radial direction extending outward from the axis, and a tangential direction extending substantially perpendicular to the radial direction.

The conductor includes a solid core, which has radial faces substantially perpendicular, or corresponding, to the radial direction of the electric machine and has tangential faces substantially perpendicular, or corresponding, to the tangential direction of the electric machine. At least one tangential depression is formed on, or into, at least one of the tangential faces. Each of the tangential depressions creates a tangential void within a rectangular envelope defined by the solid core. Therefore, the surface area of the solid core is greater than the surface area of the rectangular envelope.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
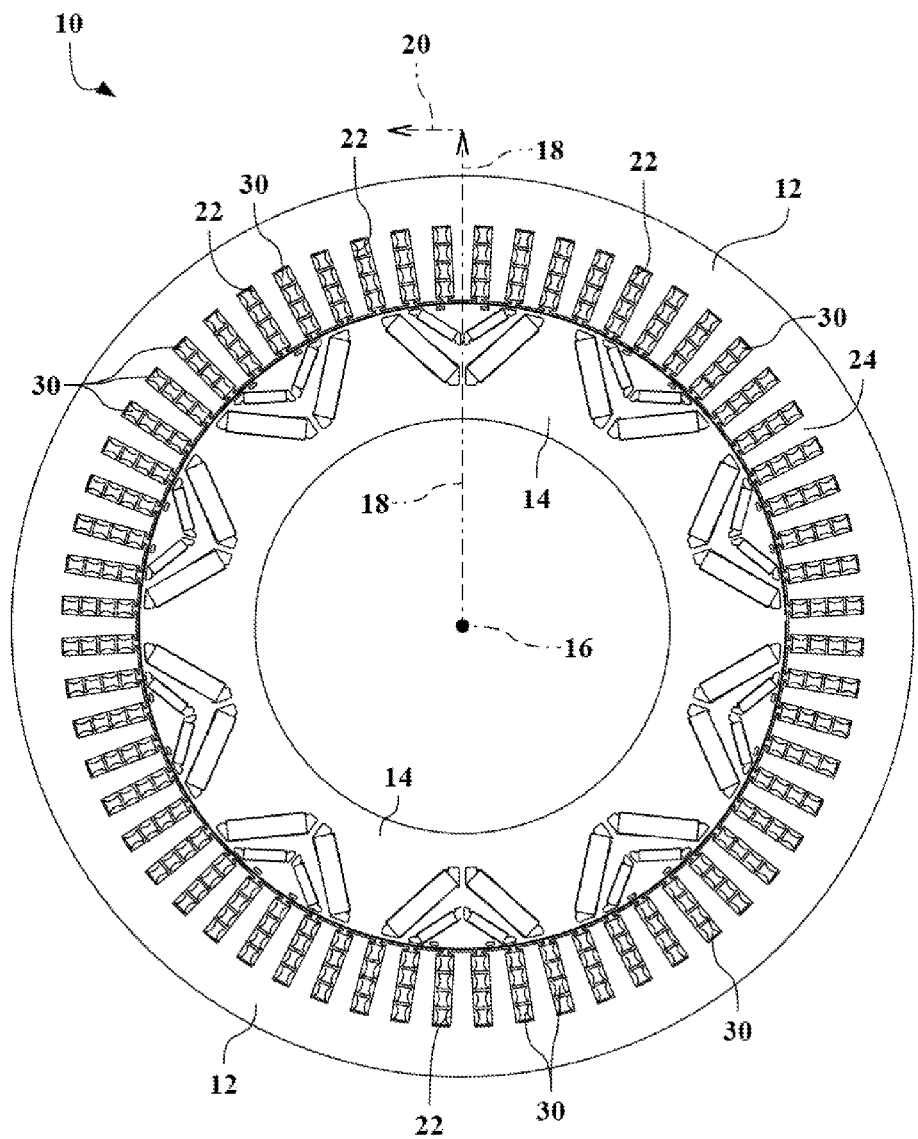
FIG. 1 is a schematic plane-intersection view of a stator and a rotor for an electric machine.
Figure 2:
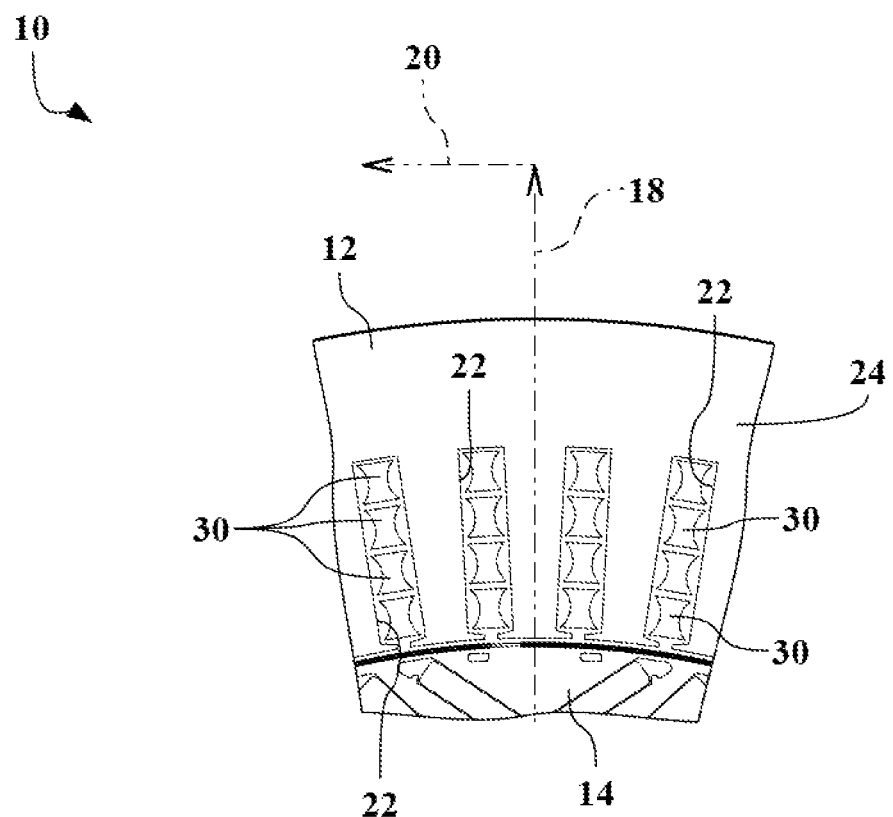
FIG. 2 is a close-up view of a portion of the rotor and stator shown in FIG. 1, showing bar conductors stacked in radial slots of the stator.

Referring to the drawings, wherein like reference numbers correspond to like or similar components whenever possible throughout the several figures, there are shown in FIG. 1 and FIG. 2 two schematic views of a portion of an electric machine 10. The electric machine 10 shown in FIGS. 1 and 2 is an external, bar-wound stator 12, which cooperates with an internal rotor 14 in the electric machine 10.

FIG. 1 shows a plane-intersection view of the stator 12 and the rotor 14. FIG. 2 shows a close-up view of a portion of the rotor 14 and stator 12 shown in FIG. 1. Features and components shown in other figures may be incorporated and used with those shown in FIG. 1, and components may be mixed and matched between any of the configurations shown.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The electric machine 10 rotates about an axis 16 and may be described with a cylindrical coordinate system. However, other coordinate systems may be used relative to the electric machine 10, the stator 12, or the rotor 14. The rotor 14 rotates about the axis 16 within the stator 12.

The axis 16 is directly perpendicular to the view (into, and out of, the page) of FIG. 1 and defines an axial direction, which includes any movement or location along and parallel to the axis 16. The electric machine 10 also defines a radial coordinate which extends outward from the axis 16, and a radial direction 18 representing movement away from the axis 16. Finally, the electric machine 10 defines an angular or tangential coordinate, which is always perpendicular to the radial direction 18 and describes movement in a tangential direction 20. The tangential direction 20 represents rotation of the electric machine 10 during operation.

The stator 12 includes a plurality of conductor slots 22 formed in a stator core 24. Each conductor slot 22 is substantially parallel to the radial direction 18. One or more conductors 30 are disposed within the conductor slots 22. The stator 12 is shown with four conductors 30 per conductor slot 22. However, additional or fewer conductors 30 may be disposed within the conductor slots 22.

The conductors 30 are bar-type conductors stacked in the conductor slots 22 along a single line in the radial direction 18. The stator core 24 and the conductors 30, which may be collectively referred to as the windings, are the main components of the stator 12.

Figure 3A:
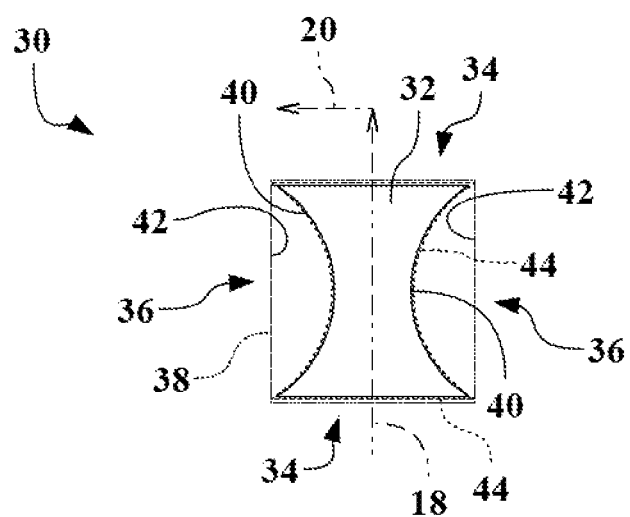
FIG. 3A is schematic diagrammatic view of one of the bar conductors shown in FIGS. 1 and 2.

Referring now to FIG. 3A, and with continued reference to FIGS. 1-2, there is shown a more-detailed view of the conductor 30, which may be used in the stator 12 shown in FIGS. 1 and 2, and also in other stators or in rotors having windings. The conductor 30 is shown in FIG. 3A with the radial direction 18 being vertical and the tangential direction 20 horizontal. The positive and negative vectors of the radial direction 18 (upward or downward) and the tangential direction 20 (leftward or rightward) are not limiting.

The conductor 30 includes a solid core 32 formed from conductive materials, such as copper and copper alloys. The solid core 32 has radial faces 34 substantially perpendicular, or corresponding, to the radial direction 18 of the electric machine 10 and tangential faces 36 substantially perpendicular, or corresponding, to the tangential direction 20 of the electric machine 10. The solid core 32 defines a rectangular envelope 38 along its periphery. If the solid core 32 were shaped as a rectangle, it would substantially fill the rectangular envelope 38.

The conductor 30 includes at least one tangential depression 40 formed on at least one of the tangential faces 36. The tangential depressions 40 shown in FIG. 3A are concave cuts or deformations that substantially cover each of the tangential faces 36. While two tangential depressions 40 are shown on the conductor 30, other configurations may have only one tangential depression 40 on only one of the tangential faces 36.

The tangential depressions 40 create corresponding tangential voids 42 within the rectangular envelope 38. The tangential voids 42 exist between the rectangular envelope 38 and the solid core 32. Due to the tangential depressions 40, the surface area of the solid core 32 is greater than the surface area of the rectangular envelope 38. Note that both the solid core 32 and the rectangular envelope 38 are shown in two dimensions in FIG. 3A, but the perimeter of each is substantially proportional to the surface area of the three-dimensional shape.

The conductor 30 also includes an insulation layer 44 surrounding the solid core 32. As used herein, the insulation layer 44 may be used to identify and define an individual conductor 30, as opposed to the stacks of multiple conducts 30 disposed within the conductor slots 22. The insulation layer 44 may be an enameled or varnish-based insulation, or the insulations layer 44 may be an aramid fiber-based wrap (for example and without limitation: Nomex, Kevlar, or Krypton tape). Note that the insulation layer 44 is shown only schematically in FIG. 3A, and the path and thickness of the insulation layer 44 may be different.

When installed in the conductor slots 22 of the stator 12, the tangential voids 42 will result in air pockets or inclusions between the stator core 24 and the conductors 30. If the insulation layer 44 is applied as a varnish, as shown in FIG. 3A, the insulation layer 44 will follow the tangential depressions 40 and the periphery of the solid core 32. However, if the insulation layer 44 is applied as fiber or tape wrap, the insulation layer 44 will substantially match the path of the rectangular envelope 38.

For the conductor 30 shown in FIG. 3A, the tangential depressions 40 do not intersect any of the radial faces 34. Therefore, the radial faces 34 remain substantially coincident with the rectangular envelope 38. Furthermore, the insulation layer 44 on the radial faces 34 is substantially coincident with the rectangular envelope 38.

Compared to a rectangular bar conductor—which would fill the rectangular envelope 38—the conductor 30 reduces eddy current effects experienced by the conductor 30 as a result of changing electrical current, electromagnetic fields, and flux during operation of the electric machine 10. Furthermore, the proximity effects caused by adjacent conductors 30 within the same conductor slot 22 or from nearby conductor slots 22 are reduced. Reducing the eddy currents and proximity effects between the conductors 30 may reduce the resistance caused by the conductors 30 during operation of the electric machine 10. Reduced resistance in the conductors 30 may improve the operating efficiency of the electric machine 10.

FIGS. 3A through 3E show different bar conductor shapes. All of which have some measure of reduced copper losses (such as conductor resistance) at varying operating conditions (speed, torque, current) of the electric machine 10. Features and components shown in other figures may be incorporated and used with those shown in individual FIGS. 3A-3E, and components may be mixed and matched between any of the configurations shown.

Figure 3B:
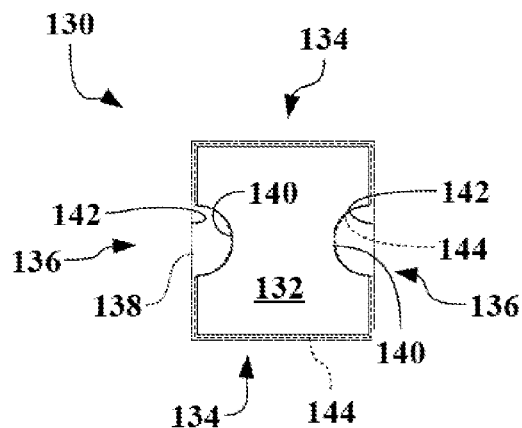
FIG. 3B is schematic diagrammatic view of another bar conductor usable with the stator shown in FIGS. 1 and 2.

Referring now to FIG. 3B, and with continued reference to FIGS. 1-3A, there is shown a detailed view of a conductor 130, which may be used in the stator 12 shown in FIGS. 1 and 2, and also in other stators or in rotors having windings. Although not separately shown, the radial direction 18 is again vertical and the tangential direction 20 horizontal.

The conductor 130 includes a solid core 132 having radial faces 134 substantially perpendicular, or corresponding, to the radial direction 18 of the electric machine 10 and having tangential faces 136 substantially perpendicular, or corresponding, to the tangential direction 20 of the electric machine 10. The solid core 132 defines a rectangular envelope 138 along its periphery. If the solid core 132 were shaped as a rectangle, it would substantially fill the rectangular envelope 138.

The conductor 130 includes a tangential depression 140 formed on each of the tangential faces 136. The tangential depressions 140 shown in FIG. 3B are again concave cuts. However, these tangential depressions 140 do not substantially cover the tangential faces 136 and have a smaller radius than the tangential depressions 40 shown in FIG. 3A.

The tangential depressions 140 create corresponding tangential voids 142 within the rectangular envelope 138. Due to the tangential depressions 140, the surface area of the solid core 132 is greater than the surface area of the rectangular envelope 138. The conductor 130 also includes an insulation layer 144 surrounding the solid core 132. For the conductor 130 shown in FIG. 3B, the tangential depressions 140 do not intersect any of the radial faces 134. Therefore, the radial faces 134—and the insulation layer 144 on the radial faces 134—remain substantially coincident with the rectangular envelope 138.

Figure 3C:
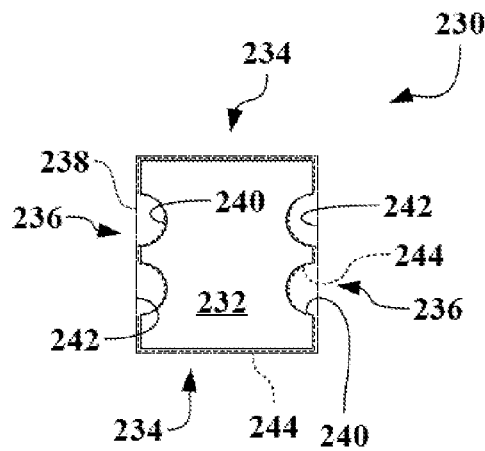
FIG. 3C is schematic diagrammatic view of another bar conductor usable with the stator shown in FIGS. 1 and 2.

Referring now to FIG. 3C, and with continued reference to FIGS. 1-3B, there is shown a detailed view of a conductor 230, which may be used in the stator 12 shown in FIGS. 1 and 2, and also in other stators or in rotors having windings. Although not separately shown, the radial direction 18 is again vertical and the tangential direction 20 horizontal.

The conductor 230 includes a solid core 232 having radial faces 234 substantially perpendicular, or corresponding, to the radial direction 18 of the electric machine 10 and having tangential faces 236 substantially perpendicular, or corresponding, to the tangential direction 20 of the electric machine 10. The solid core 232 defines a rectangular envelope 238 along its periphery. If the solid core 232 were shaped as a rectangle, it would substantially fill the rectangular envelope 238.

The conductor 230 includes two tangential depressions 240 formed on each of the tangential faces 236, such that a total of four tangential depressions 240 are formed in the tangential direction 20. The tangential depressions 240 shown in FIG. 3C are again small concave cuts, similar to the tangential depressions 140 shown in FIG. 3B.

The tangential depressions 240 create corresponding tangential voids 242 within the rectangular envelope 238. Due to the tangential depressions 240, the surface area of the solid core 232 is greater than the surface area of the rectangular envelope 238. The conductor 230 also includes an insulation layer 244 surrounding the solid core 232. For the conductor 230 shown in FIG. 3C, the tangential depressions 240 do not intersect any of the radial faces 234. Therefore, the radial faces 234—and the insulation layer 244 on the radial faces 234—remain substantially coincident with the rectangular envelope 238.

Figure 3D:
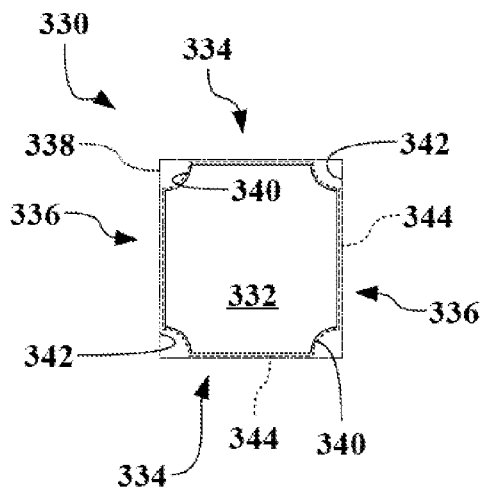
FIG. 3D is schematic diagrammatic view of another bar conductor usable with the stator shown in FIGS. 1 and 2.

Referring now to FIG. 3D, and with continued reference to FIGS. 1-3C, there is shown a detailed view of a conductor 330, which may be used in the stator 12 shown in FIGS. 1 and 2, and also in other stators or in rotors having windings. Although not separately shown, the radial direction 18 is again vertical and the tangential direction 20 horizontal.

The conductor 330 includes a solid core 332 having radial faces 334 substantially perpendicular, or corresponding, to the radial direction 18 of the electric machine 10 and having tangential faces 336 substantially perpendicular, or corresponding, to the tangential direction 20 of the electric machine 10. The solid core 332 defines a rectangular envelope 338 along its periphery. If the solid core 332 were shaped as a rectangle, it would substantially fill the rectangular envelope 338.

The conductor 330 includes two tangential depressions 340 formed on each of the tangential faces 336, such that a total of four tangential depressions 340 are formed in the tangential direction 20. The tangential depressions 340 shown in FIG. 3D are again small concave cuts. However, the tangential depressions 340 extend onto, and intersect, the radial faces 334. Unlike the conductors 30, 130, and 230 shown in FIGS. 3A-3C, the conductor 330 is substantially symmetric on its radial faces 334 and tangential faces 336.

The tangential depressions 340 create corresponding tangential voids 342 within the rectangular envelope 338. Due to the tangential depressions 340, the surface area of the solid core 332 is greater than the surface area of the rectangular envelope 338. The conductor 330 also includes an insulation layer 344 surrounding the solid core 332. Central portions of the insulation layer 344 on the radial faces 334 and the tangential faces 336 remain substantially coincident with the rectangular envelope 338.

Figure 3E:
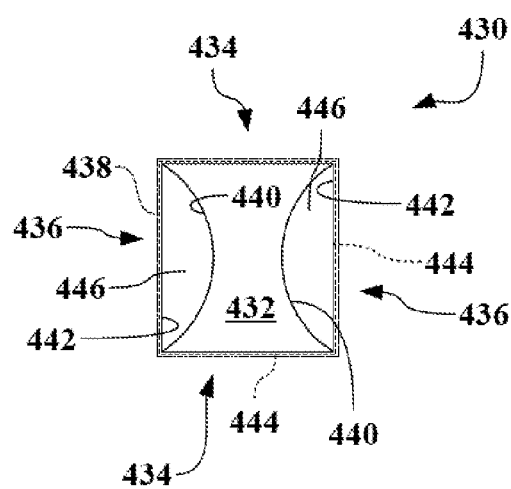
FIG. 3E is schematic diagrammatic view of another bar conductor usable with the stator shown in FIGS. 1 and 2, and having a filler disposed within tangential voids.

Referring now to FIG. 3E, and with continued reference to FIGS. 1-3D, there is shown a detailed view of a conductor 430, which may be used in the stator 12 shown in FIGS. 1 and 2, and also in other stators or in rotors having windings. Although not separately shown, the radial direction 18 is again vertical and the tangential direction 20 horizontal.

The conductor 430 includes a solid core 432 having radial faces 434 substantially perpendicular, or corresponding, to the radial direction 18 of the electric machine 10 and having tangential faces 436 substantially perpendicular, or corresponding, to the tangential direction 20 of the electric machine 10. The solid core 432 defines a rectangular envelope 438 along its periphery. If the solid core 432 were shaped as a rectangle, it would substantially fill the rectangular envelope 438.

The conductor 430 includes a tangential depression 440 formed on each of the tangential faces 436. The tangential depressions 440 shown in FIG. 3E are again concave cuts substantially cover the tangential faces 436, similar to the tangential depressions 40 shown in FIG. 3A.

The tangential depressions 440 create corresponding tangential voids 442 within the rectangular envelope 438. Due to the tangential depressions 440, the surface area of the solid core 432, and the conductive material, is greater than the surface area of the rectangular envelope 438. However, instead of air inclusions in the tangential voids 442, a filler material 446 is disposed within the tangential voids 442.

The conductor 430 also includes an insulation layer 444 surrounding the solid core 432. The insulation layer 444 surrounds both the filler material 446 and the solid core 432. Therefore, the insulation layer 444 is substantially coincident with the rectangular envelope 438 on both the radial faces 434 and the tangential faces 436.

Figure 4:
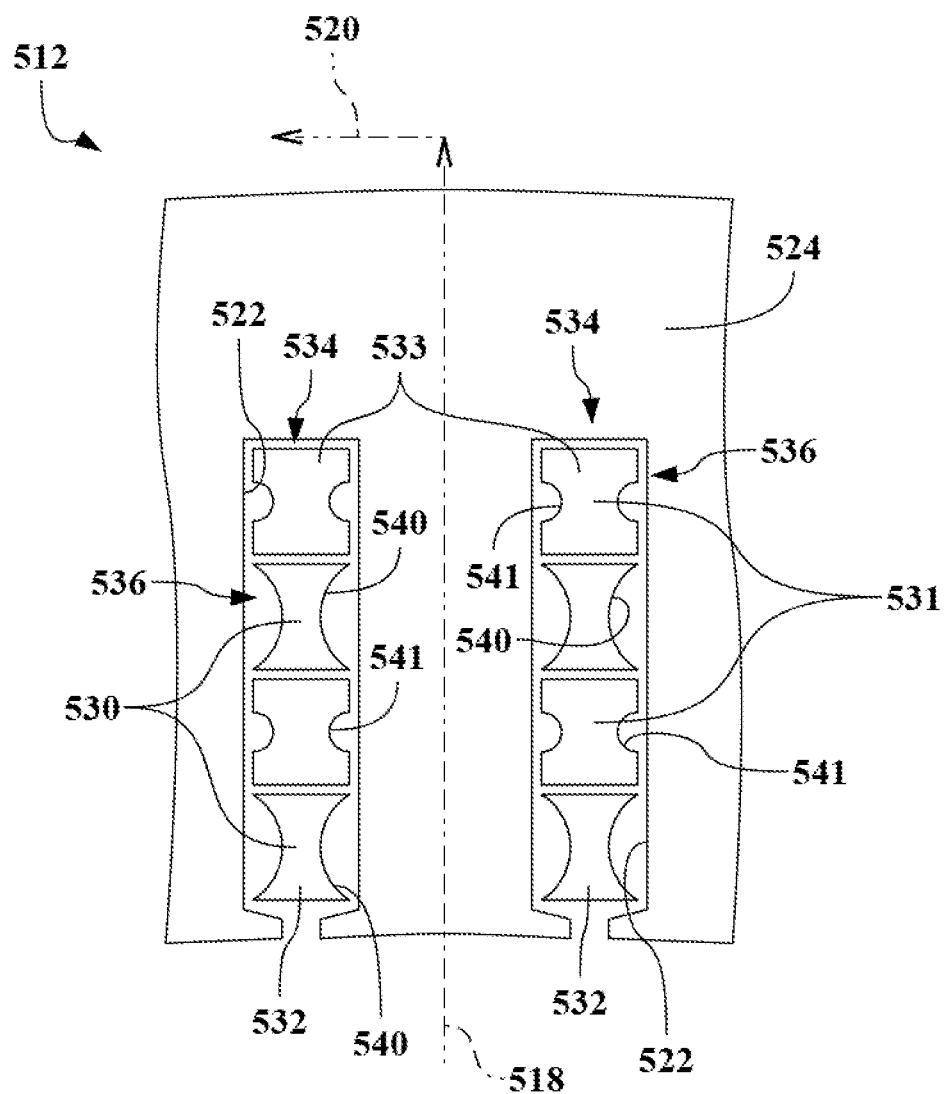
FIG. 4 is a schematic plane-intersection view of a portion of another stator, showing variable-order stacking of different bar conductors in radial slots of the stator.

Referring now to FIG. 4, and with continued reference to FIGS. 1-3E, there is shown a detailed view of a portion of a stator 512, which is similar to the stator 12 shown in FIGS. 1 and 2, and may be a portion of an electric machine (not separately numbered). Features and components shown in other figures may be incorporated and used with those shown in FIG. 4, and components may be mixed and matched between any of the configurations shown.

An axis (not shown) is defined substantially through the center of the stator 512, and a rotor (not shown) rotates about the same axis. A radial direction 518 extending outward from the axis, and a tangential direction 520 is perpendicular to the radial direction 518.

The stator 512 includes a plurality of conductor slots 522 formed in a stator core 524. Each conductor slot 522 extends along a single radial direction 518 and is equal in the tangential direction 520. Each conductor slot 522 has at least a first conductor 530 and a second conductor 531 disposed therein.

The first conductor 530 includes a first solid core 532 having radial faces 534 substantially perpendicular, or corresponding, to the radial direction 518 and tangential faces 536 substantially perpendicular, or corresponding, to the tangential direction 520 of the electric machine. A first tangential depression 540 is formed on each of the tangential faces 536 of the first solid core 532.

The second conductor 531 is disposed within the same conductor slot 522 as the first conductor 530, but is stacked above or below the first conductor 530 in the radial direction 518. Alternatively stated, the first conductor 530 is parallel to the second conductor 531 in the tangential direction 520 or is aligned along the same radial lines/axis.

The second conductor 531 includes a second solid core 533 having radial faces 534 substantially perpendicular, or corresponding, to the radial direction 518 and tangential faces 536 substantially perpendicular, or corresponding, to the tangential direction 520 of the electric machine. A second tangential depression 541 is formed on each of the tangential faces 536 of the second solid core 533. The first conductor 530 and the second conductor 531 may be covered with an insulation layer (not separately shown) that substantially tracks the periphery of the first conductor 530 and the second conductor 531.

The first tangential depression 540 and the second tangential depression 541 are not substantially identical, such that the stator 512 includes different conductor shapes within its conductor slots 522. The pattern of conductor shapes—alternating between the first conductor 530 and the second conductor 531—shown in FIG. 4 is not limiting. Additional conductor shapes, including (without limitation) any of those shown in FIGS. 3A-3E, may be used within the same conductor slot 522. Furthermore, different conductor slots 522 within the stator 512 may have varying stacks of the different conductors or varying orders of the conductors.

Figure 5:
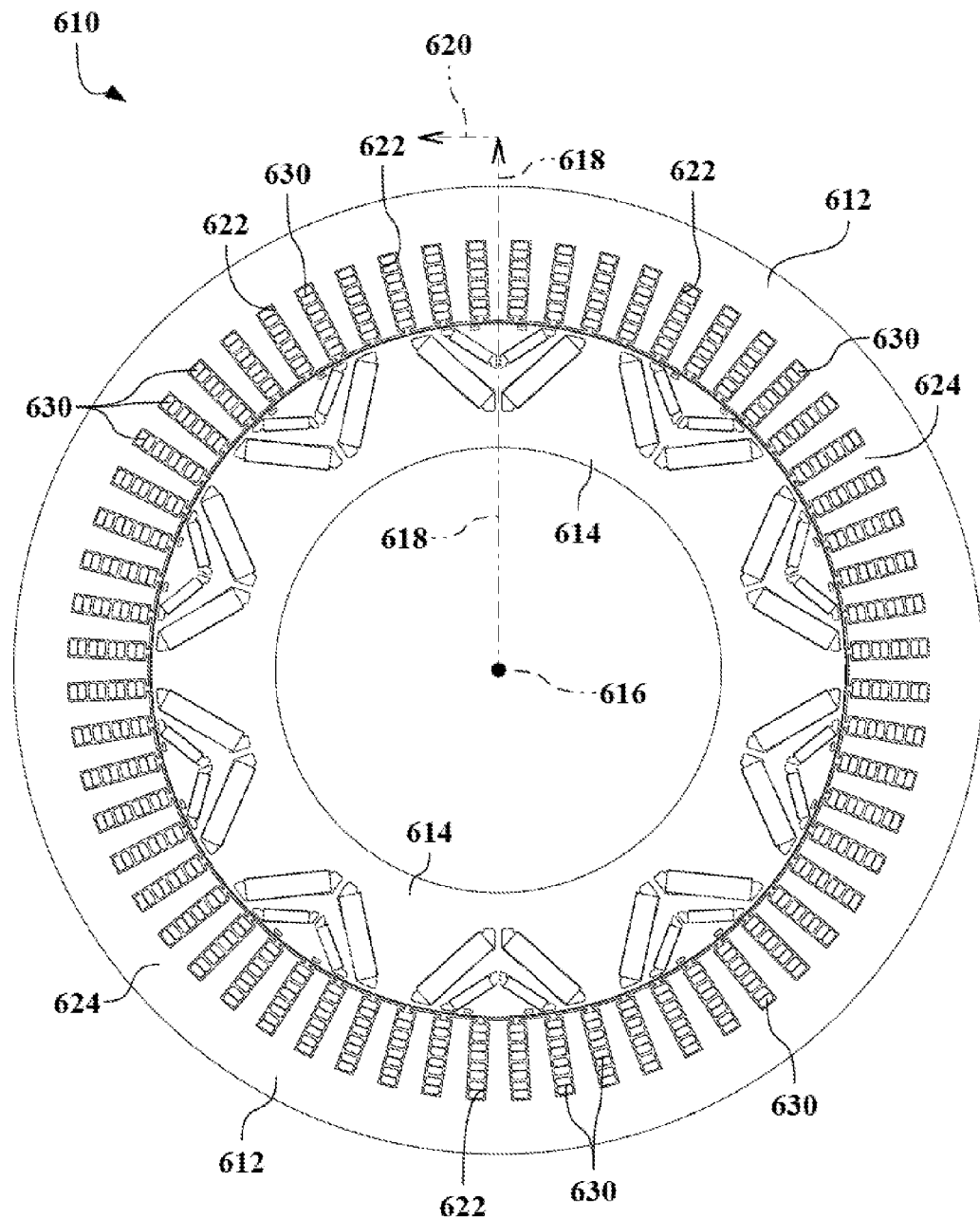
FIG. 5 is a schematic plane-intersection view of a portion of another stator, showing multi-filar bar conductors stacked in radial slots of the stator.

Referring now to FIG. 5, and with continued reference to FIGS. 1-4, there is shown a schematic plane-intersection view of a portion of another electric machine 610. A stator 612 and a rotor 614 of electric machine 610 are aligned about an axis 616. The electric machine 610 defines a radial direction 618 extending outward from the axis 616 and a tangential direction 620 perpendicular to the radial direction 618.

The stator 612 includes a plurality of conductor slots 622 in a stator core 624. The conductor slots 622 are aligned in the radial direction 618. Disposed within each of the conductor slots 622 is at least one multi-filar conductor 630 for the electric machine 610. The multi-filar conductors 630 are configured to receive electrical current and create electromagnetic fields. Unlike some of the conductors described hereinabove, the multi-filar conductors 630 are formed from more than one conductive component.

Referring now to FIGS. 6A-D, and with continued reference to FIGS. 1-5, there are shown different configurations and shapes of multi-filar conductors, such as the multi-filar conductors 630 shown in FIG. 5. Each of the multi-filar conductors, or multi-filar bar conductors, may be used with the any of stators shown herein, including the stator 612 of FIG. 5 or the stator 12 shown in FIGS. 1-2.

Figure 6A:
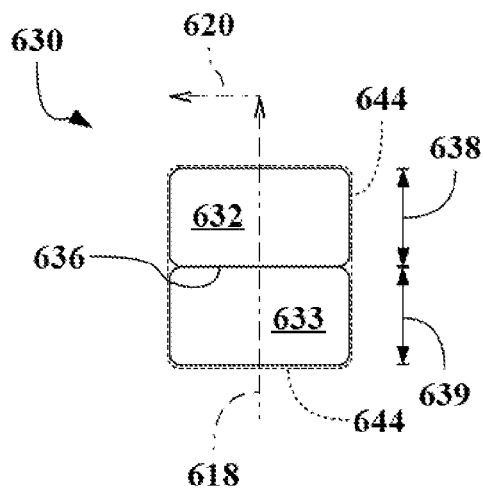
FIG. 6A is a schematic diagrammatic view of one of the multi-filar bar conductors shown in FIG. 5, which is a half-split conductor and is also usable with the stator shown in FIGS. 1 and 2.

FIG. 6A shows a schematic diagrammatic view of the multi-filar conductor 630 shown in FIG. 5. The multi-filar conductor 630 includes a first solid core 632 and a second solid core 633, which directly contacts the first solid core 632. The first solid core 632 and the second solid core 633 may be formed from conductive materials, such as copper and copper alloys. The contact zone or interface between the first solid core 632 and the second solid core 633 is a bare interface 636, such that the copper materials directly contact each other. The bare interface 636 is an area of conductor-to-conductor (in this case, metal-to-metal) contact without intermediary materials, such as insulation or fillers.

The multi-filar conductor 630 may be referred to as a half-split conductor. The second solid core 633 is aligned or stacked in the radial direction 618 above or below the first solid core 632. Therefore, the second solid core 633 and the first solid core 632 are symmetric in the tangential direction 620.

An insulation layer 644 surrounds the first and second solid cores 632, 633. The insulation layer 644 may be used to identify and define the boundaries of the individual multi-filar conductors 630. The insulation layer 644 does not pass through the bare interface 636, and there is no insulation between the first solid core 632 and the second solid core 633. The insulation layer 644 may be enamel or varnish. However, to better prevent migration of insulation between the first solid core 632 and the second solid core 633, the insulation layer 644 may be an aramid fiber-based wrap or tape (for example and without limitation: Nomex, Kevlar, or Krypton).

As shown in FIG. 6A, the first solid core 632 has a first radial thickness 638 and the second solid core 633 has a second radial thickness 639. For the multi-filar conductor 630, the first radial thickness 638 and the second radial thickness 639 are substantially equal. When compared to a rectangular bar conductor that would fit within the same envelope defined by the insulation layer 644, the first radial thickness 638 and the second radial thickness 639 are each approximately half of the size of the rectangular bar conductor.

Figure 6B:
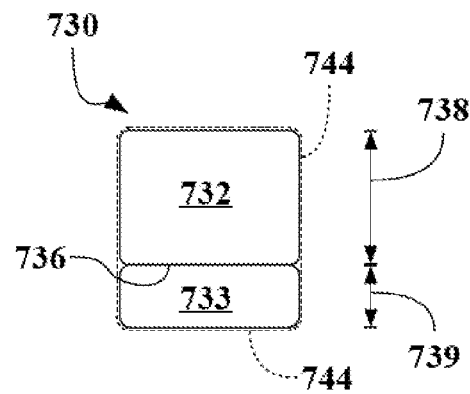
FIG. 6B is a schematic diagrammatic view of another multi-filar bar conductor, which is an offset-split conductor and is also usable with the stators shown in FIGS. 1 and 2 or FIG. 5.

FIG. 6B shows a schematic diagrammatic view of another multi-filar conductor 730, which is an offset-split conductor and is also usable with the stators shown in FIGS. 1 and 2 or FIG. 5. Although not separately shown, the radial and tangential directions are substantially identical to those shown in FIG. 6A. The multi-filar conductor 730 includes a first solid core 732 and a second solid core 733, which directly contacts the first solid core 732. The first solid core 732 and the second solid core 733 may be formed from conductive materials, such as copper and copper alloys. The contact zone or interface between the first solid core 732 and the second solid core 733 is a bare interface 736, such that the copper materials directly contact each other.

The second solid core 733 is aligned or stacked in the radial direction above or below the first solid core 732. Therefore, the second solid core 733 and the first solid core 732 are symmetric in the tangential direction.

An insulation layer 744 surrounds the first and second solid cores 732, 733. The insulation layer 744 may be used to identify and define the boundaries of the individual multi-filar conductors 730. The insulation layer 744 does not pass through the bare interface 736, and there is no insulation between the first solid core 732 and the second solid core 733. The insulation layer 744 may be enamel or varnish. However, to better prevent migration of insulation between the first solid core 732 and the second solid core 733, the insulation layer 744 may be a wrap or tape.

As shown in FIG. 6B, the first solid core 732 has a first radial thickness 738 and the second solid core 733 has a second radial thickness 739. For the multi-filar conductor 730, the first radial thickness 738 and the second radial thickness 739 are not substantially equal, such that the bare interface 736 is offset radially.

The relative sizes of the first radial thickness 738 and the second radial thickness 739 are not limiting. In the embodiment shown in FIG. 6B, the first radial thickness 738 is larger, such that the larger conductor core is further outward. However, the second radial thickness 739 may be larger.

Figure 6C:
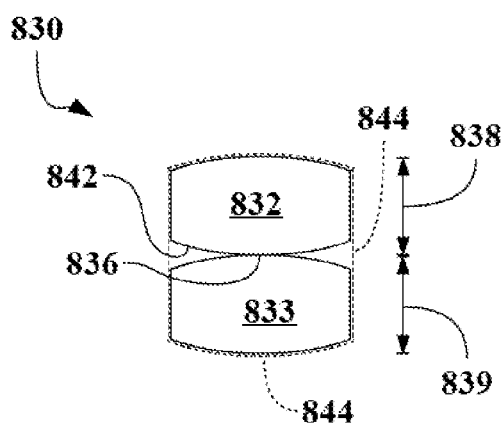
FIG. 6C is a schematic diagrammatic view of another multi-filar bar conductor, which is a double-convex conductor and is also usable with the stators shown in FIGS. 1 and 2 or FIG. 5.

FIG. 6C is a schematic diagrammatic view of another multi-filar conductor 830, a double-convex conductor, which is also usable with the stators shown in FIGS. 1 and 2 or FIG. 5. Although not separately shown, the radial and tangential directions are substantially identical to those shown in FIG. 6A. The multi-filar conductor 830 includes a first solid core 832 and a second solid core 833, which directly contacts the first solid core 832. The first solid core 832 and the second solid core 833 may be formed from conductive materials, such as copper and copper alloys. The contact zone or interface between the first solid core 832 and the second solid core 833 is a bare interface 836, such that the copper materials directly contact each other.

The second solid core 833 is aligned or stacked in the radial direction above or below the first solid core 832. Therefore, the second solid core 833 and the first solid core 832 are symmetric in the tangential direction.

An insulation layer 844 surrounds the first and second solid cores 832, 833. The insulation layer 844 may be used to identify and define the boundaries of the individual multi-filar conductors 830. The insulation layer 844 does not pass through the bare interface 836, and there is no insulation between the first solid core 832 and the second solid core 833. The insulation layer 844 may be enamel or varnish. However, to better prevent migration of insulation between the first solid core 832 and the second solid core 833, the insulation layer 844 may be a wrap or tape.

As shown in FIG. 6C, the first solid core 832 has a first radial thickness 838 and the second solid core 833 has a second radial thickness 839. For the multi-filar conductor 830, the first radial thickness 838 and the second radial thickness 839 are substantially equal, such that the bare interface 836 is balanced radially.

The multi-filar conductor 830, the first solid core 832 and the second solid core 833 are not substantially rectangular. Instead, the first solid core 832 and the second solid core 833 have a convex profile. The first solid core 832 and the second solid core 833 define tangential voids 842 on opposing sides of the bare interface 836. As shown in FIG. 6C, the insulation layer 844 overlaps the tangential voids 842 and leaves air pockets within the multi-filar conductor 830.

Figure 6D:
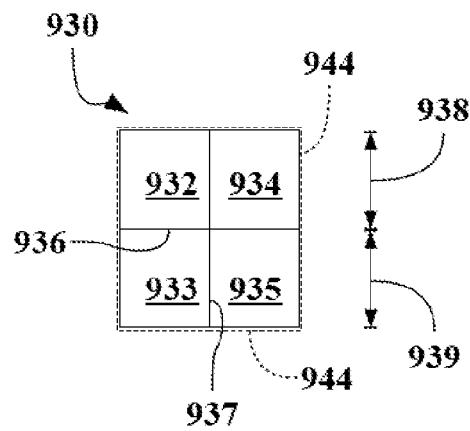
FIG. 6D is a schematic diagrammatic view of another multi-filar bar conductor, which is a quad-split conductor and is usable with the stators shown in FIGS. 1 and 2 or FIG. 5.

FIG. 6D is a schematic diagrammatic view of another multi-filar conductor 930, a quad-split conductor, which is usable with the stators shown in FIGS. 1 and 2 or FIG. 5. Although not separately shown, the radial and tangential directions are substantially identical to those shown in FIG. 6A. The multi-filar conductor 930 includes a first solid core 932 and a second solid core 933, which directly contacts the first solid core 932 along a bare interface 936. The multi-filar conductor 930 also includes a third solid core 934 and a fourth solid core 935. The third solid core 934 and the fourth solid core 935 directly contacts the first solid core 932 along an additional bare interface 937, and the fourth solid core 935 directly contacts the second solid core 933 along the additional bare interface 937.

The first solid core 932 and the second solid core 933 may be formed from conductive materials, such as copper and copper alloys. Therefore, the copper materials directly contact each other.

In the configuration shown in FIG. 6D, the second solid core 933 is aligned or stacked below the first solid core 932 in the radial direction. The third solid core 934 and the fourth solid core 935 are stacked next to the first solid core 932 and the second solid core 933, in the tangential direction. Therefore, the multi-filar conductor 930 is symmetric in both the radial and tangential directions.

An insulation layer 944 surrounds the first and second solid cores 932, 933 and also the third and fourth solid cores 934, 935. The insulation layer 944 may be used to identify and define the boundaries of individual multi-filar conductors 930. The insulation layer 944 does not pass through the bare interface 936 or the additional bare interface 937. There is no insulation between the first solid core 932 and the second solid core 933 or between the third solid core 934 and the fourth solid core 935. The insulation layer 944 may be enamel or varnish. However, to better prevent migration of insulation into the bare interface 936 or the additional bare interface 937, the insulation layer 944 may be a wrap or tape applied after the first and second solid cores 932, 933 or the third and fourth solid cores 934, 935 are placed together.

As shown in FIG. 6D, the first solid core 932 and the third solid core 934 have a first radial thickness 938, and the second solid core 933 and the fourth solid core 935 have a second radial thickness 939. The first radial thickness 938 and the second radial thickness 939 are substantially equal, such that the bare interface 936 is balanced radially.

Figure 7:
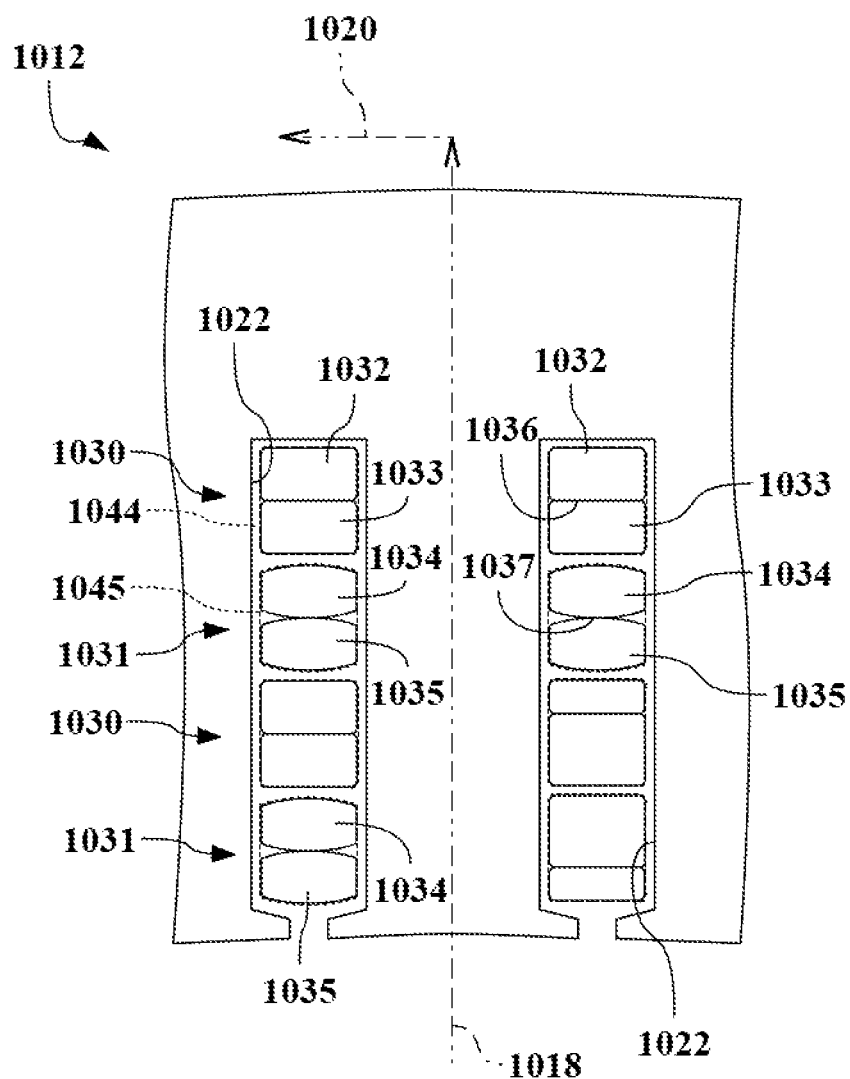
FIG. 7 is a schematic plane-intersection view of a portion of another stator, showing variable-order stacking of different multi-filar bar conductors in radial slots of the stator.

Referring now to FIG. 7, and with continued reference to FIGS. 1-6D, there is shown a schematic plane-intersection view of a portion of another stator 1012, which may be used with an electric machine (not separately shown). The stator 1012 in FIG. 7 shows variable-order stacking of (at least two) different multi-filar bar conductors, such as those shown in FIGS. 6A-6D.

The stator 1012 (and a rotor, not shown) has a center axis (not shown). The stator 1012 defines a radial direction 1018 extending outward from the axis, and defines a tangential direction 1020 perpendicular to the radial direction 1018. The stator 1012 includes a plurality of conductor slots 1022, which are each aligned in the radial direction 1018.

A first multi-filar conductor 1030 is disposed within one of the plurality of conductor slots 1022. A second multi-filar conductor 1031 is also disposed within the same one of the conductor slots 1022. The second multi-filar conductor 1031 is above or below the first multi-filar conductor 1030 in the radial direction 1018. Although specific examples are shown, the first and second multi-filar conductors 1030, 1031 may be any of the multi-filar conductors (630, 730, 830, 930) shown in FIGS. 6A-6D or may be any of the conductors (30, 130, 230, 330, 430) shown in FIGS. 3A-3E.

In the configuration shown in FIG. 7, the first multi-filar conductor 1030 includes a first solid core 1032 and a second solid core 1033 directly contacting the first solid core 1032 along a first bare interface 1036. A first insulation layer 1044 surrounds the first and second solid cores 1032, 1033. However, the first insulation layer 1044 does not pass through the first bare interface 1036, such that there is no insulation between the first solid core 1032 and the second solid core 1033.

In the configuration shown in FIG. 7, the second multi-filar conductor 1031 includes a third solid core 1034 and a fourth solid core 1035 directly contacting the third solid core 1034 along a second bare interface 1037. A second insulation layer 1045 surrounds the third and fourth solid core 1034, 1035. However, the second insulation layer 1045 does not pass through the second bare interface 1037, such that there is no insulation between the third solid core 1034 and the fourth solid core 1035.

In the stator 1012, the second multi-filar conductor 1031 is not substantially identical to the first multi-filar conductor 1030. The first and second multi-filar conductors 1030, 1031 may be stacked in any order relative to each other, and may be combined with additional conductor types. Furthermore, the first and second multi-filar conductors 1030, 1031 need not be stacked within the exact same order within each of the conductor slots 1022.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A conductor for an electric machine having an axis, a radial direction extending outward from the axis, and a tangential direction perpendicular to the radial direction, the conductor comprising:
    a solid core having radial faces substantially perpendicular to the radial direction of the electric machine and tangential faces substantially perpendicular to the tangential direction of the electric machine; and
    at least two tangential depressions formed on each tangential face, wherein each tangential depression creates a tangential void within a rectangular envelope defined by the solid core, such that the surface area of the solid core is greater than the surface area of the rectangular envelope, and wherein the tangential depressions do not intersect any of the radial faces.

2. The conductor of claim 1, further comprising an insulation layer surrounding the solid core.

3. The conductor of claim 2, further comprising a filler material disposed within the tangential voids, wherein the insulation layer surrounds both the filler material and the solid core.

4. A stator for an electric machine having an axis, a radial direction extending outward from the axis, and a tangential direction perpendicular to the radial direction, the stator comprising:
   a plurality of conductor slots, wherein each conductor slot is aligned in the radial direction;
   a first conductor disposed within one of the plurality of conductor slots, including:
      a first solid core having radial faces substantially perpendicular to the radial direction of the electric machine and tangential faces substantially perpendicular to the tangential direction of the electric machine, and
      a first tangential depression formed on each of the tangential faces of the first solid core, wherein the first tangential depression is a concavity; and
   a second conductor disposed within the same one of the conductor slots as the first conductor and one of above and below the first conductor in the radial direction, including:
      a second solid core having radial faces substantially perpendicular to the radial direction of the electric machine and tangential faces substantially perpendicular to the tangential direction of the electric machine, and
      a second tangential depression formed on each of the tangential faces of the second solid core, wherein the second tangential depression is a concavity, and the first tangential depression and the second tangential depression are not substantially identical.

5. The stator of claim 4, further comprising:
   a first insulation layer surrounding the first solid core; and
   a second insulation layer surrounding the second solid core.

6. The stator of claim 5, wherein the first tangential depression substantially covers each of the tangential faces of the first solid core.

7. The stator of claim 6, wherein the first tangential depression does intersect any of the radial faces of the first solid core, and the second tangential depression does intersect any of the radial faces of the second solid core.

8. A conductor for an electric machine having an axis, a radial direction extending outward from the axis, and a tangential direction perpendicular to the radial direction, the conductor comprising:
   a solid core having radial faces substantially perpendicular to the radial direction of the electric machine and tangential faces substantially perpendicular to the tangential direction of the electric machine; and
   at least two tangential depressions formed on at least one of the tangential faces, wherein each tangential depression creates a tangential void within a rectangular envelope defined by the solid core, such that the surface area of the solid core is greater than the surface area of the rectangular envelope.

9. The conductor of claim 8, wherein the at least two tangential depressions do not intersect any of the radial faces.

10. The conductor of claim 9, further comprising a tangential depression on each tangential face.

11. The conductor of claim 10, further comprising two tangential depressions on each tangential face.

* * * * *